US005645339A

United States Patent [19]

Tatsukawa

[11] Patent Number: 5,645,339

[45] Date of Patent: Jul. 8, 1997

[54] VEHICLE HEADLAMP CONSTRUCTION FOR A WELL DEFINED LOWER BEAM PATTERN

[75] Inventor: Masashi Tatsukawa, Shimizu, Japan

[73] Assignee: Koiko Manufacturing Co., Ltd., Tokyo, Japan

[21] Appl. No.: 296,190

[22] Filed: Aug. 25, 1994

[30] Foreign Application Priority Data

Aug. 25, 1993 [JP] Japan .................................. 5-230724

[51] Int. Cl.[6] ................................................ B60Q 1/04

[52] U.S. Cl. ............................ 362/61; 362/328; 362/307; 362/308

[58] Field of Search ............................ 362/61, 328, 307, 362/308

[56] References Cited

U.S. PATENT DOCUMENTS

| | | | |
|---|---|---|---|
| 4,208,704 | 6/1980 | Draper | 362/61 |
| 4,882,660 | 11/1989 | Liverance et al. | 362/226 |
| 4,893,218 | 1/1990 | Dilk et al. | 362/61 |
| 4,922,398 | 5/1990 | Muto | 302/296 |
| 4,926,301 | 5/1990 | Liverance et al. | 362/226 |
| 5,010,458 | 4/1991 | Fraizer | 362/80 |
| 5,067,054 | 11/1991 | Oshio et al. | 362/61 |
| 5,083,245 | 1/1992 | Fray et al. | 362/61 |
| 5,111,368 | 5/1992 | Suzuki et al. | 362/61 |
| 5,192,124 | 3/1993 | Kawashima et al. | 362/61 |
| 5,195,815 | 3/1993 | Watanabe et al. | 362/61 |
| 5,215,368 | 6/1993 | Neumann | 362/61 |

*Primary Examiner*—Ira S. Lazarus
*Assistant Examiner*—Alfred Basichas
*Attorney, Agent, or Firm*—Sughrue, Mion, Zinn Macpeak & Seas

[57] ABSTRACT

A vehicular headlamp has a reflector which is so optically designed as to provide, by reflecting light from a light source, a basic beam pattern of approximately semicircular shape wholly disposed below the horizon, with a top edge cutoff extending horizontally. A front lens is stepped to produce a lower beam pattern by raising part of the basic beam pattern and by horizontally expanding the rest of the basic beam pattern. The top edge cutoff of the lower beam pattern is as clearcut as that of the basic beam pattern. Either of two different lower beam patterns required for vehicles keeping to the right and for those keeping to the left is producible merely by changing the optical design of the front lens.

8 Claims, 8 Drawing Sheets

VEHICLE HEADLAMP CONSTRUCTION FOR A WELL DEFINED LOWER BEAM PATTERN

BACKGROUND OF THE INVENTION

This invention relates to electric lamps in general and, in particular, to a headlamp for motor vehicles designed to provide a lower beam pattern of clearcut outline.

A long familiar construction of vehicle headlamps was such that an electric bulb was disposed in from of a paraboloidal reflector, with the coiled filament of the bulb positioned approximately at the focus of the reflector and with the filament axis in alignment with the optical axis of the reflector. The front lens of the lamp was stepped to diverge the reflected beam, which was itself of circular cross section, generally horizontally, and to raise part of the reflected beam up to the horizon.

The lower beam pattern produced by this conventional method is unsatisfactory in the clarity of the delineation of its outline. The top edge cutoff of the beam pattern is particularly objectionable. Since the horizontally elongate lower beam pattern was produced by diverging the reflected beam of circular cross section, the top edgee cutoff of the resulting beam was not so well defined as could be desired. The light left unshaded above the top edge cutoff represents a source of glare which can to dazzle the drivers of other vehicles and so must be reduced to an absolute minimum.

SUMMARY OF THE INVENTION

The present invention is directed to a novel headlamp construction for producing a lower beam pattern having a more clearly defined outline, particularly at the top edge cutoff, than could be obtained before.

The invention further seeks, in attaining the first recited objective, to make common use of the reflector for providing a lower beam pattern for vehicles keeping to the fight and another pattern for vehicles keeping to the left.

Briefly, the invention may be summarized as a vehicular headlamp for providing a lower beam pattern having a sharply defined top edge cutoff. The headlamp comprises a reflector for reflecting light emitted by a light source, the reflector being optically configured so as to produce a basic beam pattern which is wholly disposed below the horizon and which has a top edge cutoff extending horizontally. Also included is a front lens for producing a lower beam pattern by raising part of the basic beam pattern above the top edge cutoff and by horizontally expanding the rest of the basic beam pattern.

The entire reflective surface of the reflector is utilized for producing the basic beam pattern, which typically is substantially semicircular in shape and which is particularly notable for its clearly delineated top edge. Since the lower beam pattern is produced mostly by horizontally expanding the basic beam pattern by the front lens, the resulting lower beam pattern has a top edge cutoff as sharply defined as the top edge of the basic beam pattern.

As an additional advantage, the basic beam pattern can be modified into either of two different lower beam patterns of a symmetrical shape for vehicles keeping to the right and for those keeping to the left. Front lenses of two different optical designs may be prepared to this end. Either of the two lower beam patterns is producible by raising different pans of the basic beam pattern. The reflector itself, which is most expensive to manufacture, can be used for both purposes, affording substantial savings in the manufacturing costs of both types of headlamps.

The above and other features and advantages of the invention and the manner of realizing them will become more apparent, and the invention itself will best be understood, from a study of the following description and appended claims, with reference had to the attached drawings showing a preferable embodiment of the invention.

DETAILED DESCRIPTION

The headlamp according to the invention employs a reflector that is optically configured so as to provide per se a two-way or basic beam pattern providing a basis both for a lower beam pattern for vehicles keeping to the fight and for a lower beam pattern for those keeping to the left. The entire reflective surface of the reflector is utilized for the production of the basic beam pattern, dispensing with the cutoff shade which has conventionally been positioned under the bulb filament. The basic beam pattern is to be modified by a front lens into either of two actual lower beam patterns required.

Figure 1:
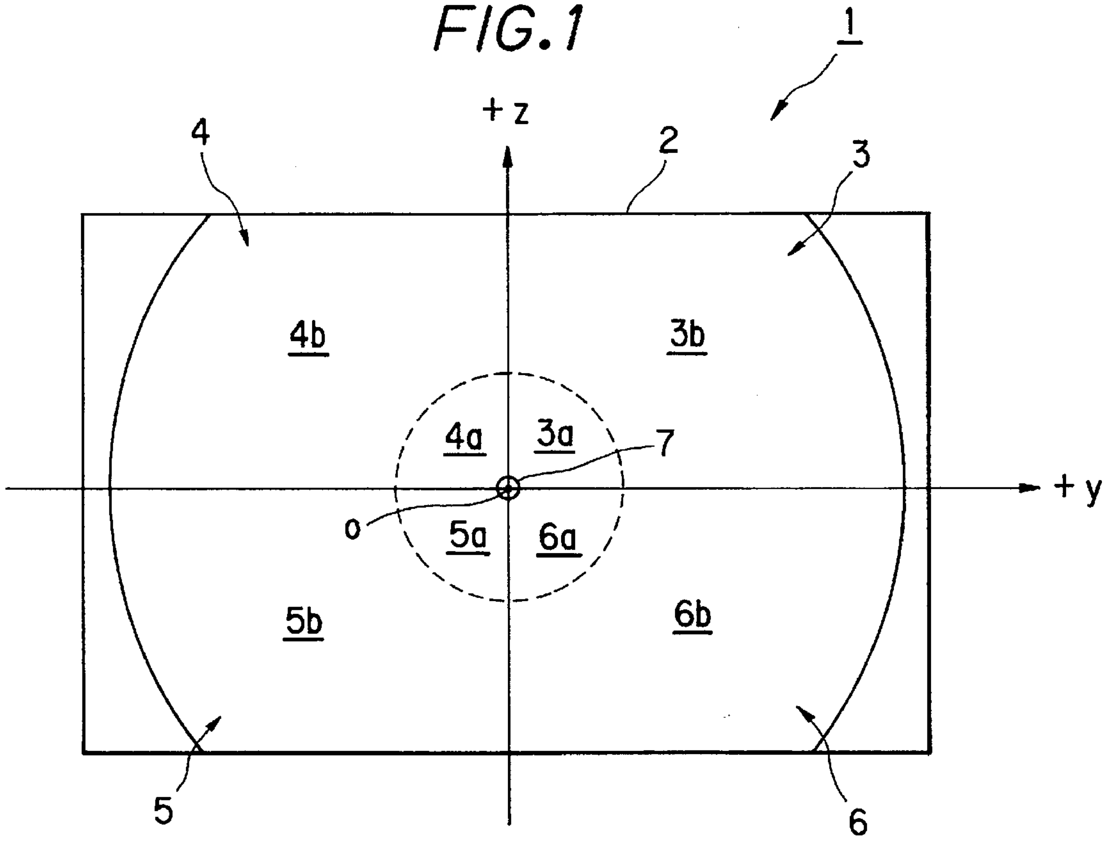
FIG. 1 is a front view of a reflector for use in the vehicular headlamp according to the invention, the view showing four notional optical divisions of the reflector surface.

FIG. 1 shows the reflector 1 in a front view, revealing its reflective surface 2. The reflector 1 is understood to have a bulb hole, not shown, formed centrally therein. Prior to the discussion of the optical design of the reflective surface 2 according to the invention, let us assume a three-dimensional rectangular coordinate system having the optical axis of the reflector 2 as the x-axis which is perpendicular to the drawing sheet and which is directed forwardly of the reflector 2 or toward the viewer in FIG. 1. The coordinate system further comprises the y-axis which extends horizontally and perpendicular to the x-axis and which is directed to the right in this figure, and the z-axis which extends vertically and perpendicular to the x- and y-axes and which is directed upwardly. The origin of O the rectangular coordinates is located approximately centrally of the reflective surface 2.

Functionally speaking, the reflective surface 2 may be thought of as being composed of four regions 3, 4, 5 and 6 occupying the first, second, third and fourth quadrants, respectively, of the yz-plane. These regions 3–6 are subdivided into inner subregions 3*a*, 4*a*, 5*a* and 6*a*, of radial arrangement about the x-axis, and outer subregions 3*b*, 4*b*, 5*b* and 6*b* which are farther away from the x-axis. Shown at 7 is a coiled bulb filament which has its axis aligned with the x-axis or the optical axis of the reflector.

The inner subregions 3*a*–6*a* of the reflective surface 2 contribute mostly to the creation of the horizontally extending part of the beam pattern. The outer subregions 3*b*–6*b* contribute mostly to the creation of the high intensity zone of the beam pattern. It should be understood that the reflective surface 2 is shown divided into the regions and subregions as above purely for the purpose of illustration and explanation of the design principles of the reflector; in fact, they are contiguous to one another without any glare-causing step or the like there between.

Figure 2A:
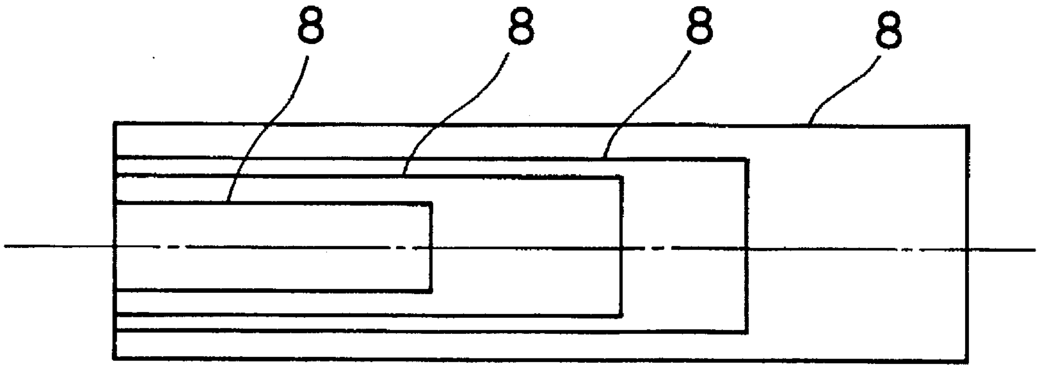
FIG. 2A and FIG. 2B are explanatory diagrams showing how the FIG. 1 reflector is optically designed to embody the principles of the invention.
Figure 2B:
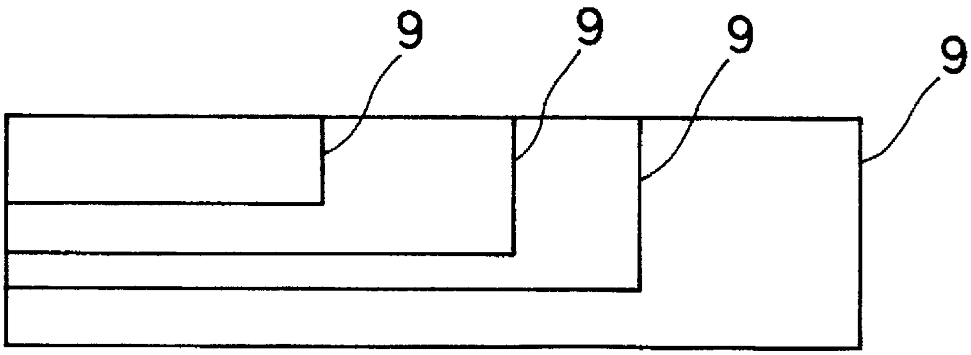

The reflective surface 2 is formed as a so-called freely curved surface that cannot be expressed algebraically but which can be designed with the aid of a computer with complex parametric and vertical computations. The freely curved reflective surface 2 is designed by first forming curved lines and then curved surfaces, largely through the following procedure:

1. Creation of curved lines:
   - (a) Parameter inputting:
     Parameters such as the focal distances of basic parabolas and their rates of deformation, the magnitudes of tangents, and the aim angle of the beam are introduced into the computer.
   - (b) Computation of curved line expressions:
     The coordinates of the beginning and end of each curved line are obtained from the basic parabolas and their rates of deformation. Then the directions of tangent vectors are computed from the aim angle of the beam, and free curves such as Ferguson's curves are computed by defining their magnitudes.
2. Creation of curved planes:
   - (a) Parameter inputting:
     There are input to the computer such parameters as twist vectors, the diameters of basic ellipses, and directions as to whether restrictive conditions such as right angular relationships are imparted to the tangent vectors. The restrictive conditions on the tangent vectors correspond to the optical alignment of the axes of the filament image as indicated in FIG. 2A, and the twisting of the tangents corresponds to moving the filament images in directions at fight angles with their longitudinal direction thereby aligning their top edges as in FIG. 2B.
   - (b) Computation of curved plane expressions:
     Curved plane patches (e.g. Coons' twin three-dimensional patches) are created. The determination of the patch coefficients requires tangent vectors and twist vectors concerning the coordinates of points and curved plane coordinates (curved plane parameters u and v). All of the point coordinates and some of the tangent vectors are predetermined by the freely curved lines obtained previously, so that the remainder of the tangent vectors are ascertained from the parameters of the basic ellipses, restrictive conditions, wist angles, and their magnitudes are adjusted. The twist vectors are computed by the methods of Adini and Forrest wherever required.

The foregoing procedure is performed on each of the four divisions 3–6, and each of the two subdivisions of each division, of the reflector surface 2.

Figure 3:
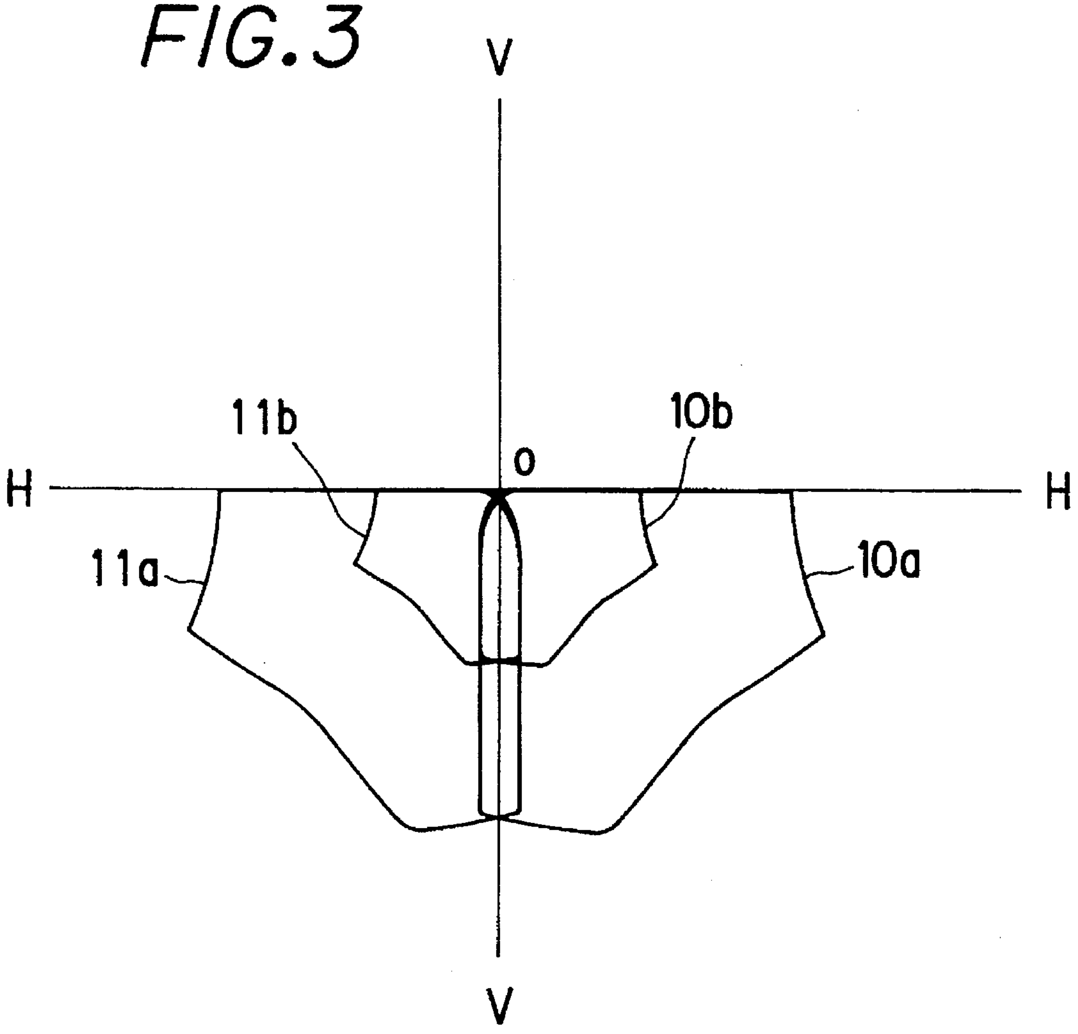
FIG. 3 shows a beam pattern due to two optical divisions of the FIG. 1 reflector.

FIG. 3 is a schematic illustration of beam patterns produced by the regions 3 and 4 of the reflector surface 2 on a test screen disposed forwardly of the reflector. Located on the fight hand side of the line of the perpendicular V—V, the patterns 10*a* and 10*b* are due to the inner subregion 3*a* and outer subregion 3*b*, respectively. The patterns 11*a* and 11*b* on the left hand side of the vertical line V—V are due to the inner subregion 4*a* and outer subregion 4*b*, respectively. All the patterns lie just under the line of the horizon H—H.

More specifically, the pattern 10*b* due to the outer subregion 3*b* lies close to the intersection 0 of the two axes. The pattern 10*a* due to the inner subregion 3*a* generally increases in its horizontal dimension as it approaches the horizontal line H—H. Similarly, the pattern 11*b* due to the outer subregion 4*b* lies close to the intersection 0. The pattern 11*a* due to the inner subregion 4*a* generally increases in its horizontal dimension as it approaches the horizontal line H—H. The top edges of all these patterns contribute to the creation of the top edge cutoff of the basic beam pattern produced by the reflector surface 2.

Figure 4A:
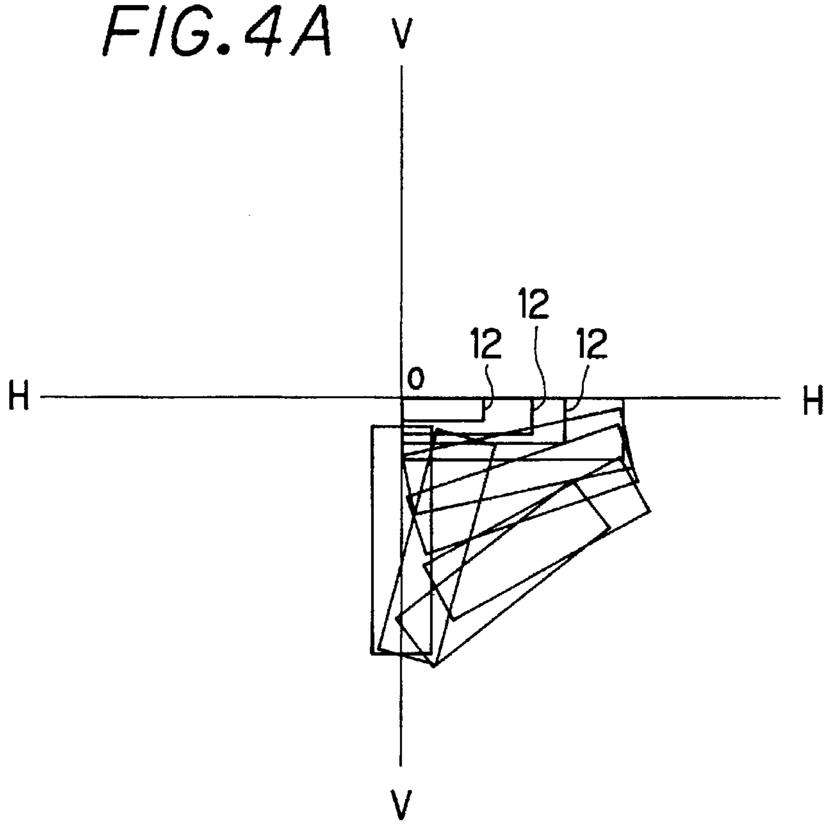
FIG. 4A and FIG. 4B are representations of filament images due to said two optical divisions of the FIG. 1 reflector.
Figure 4B:
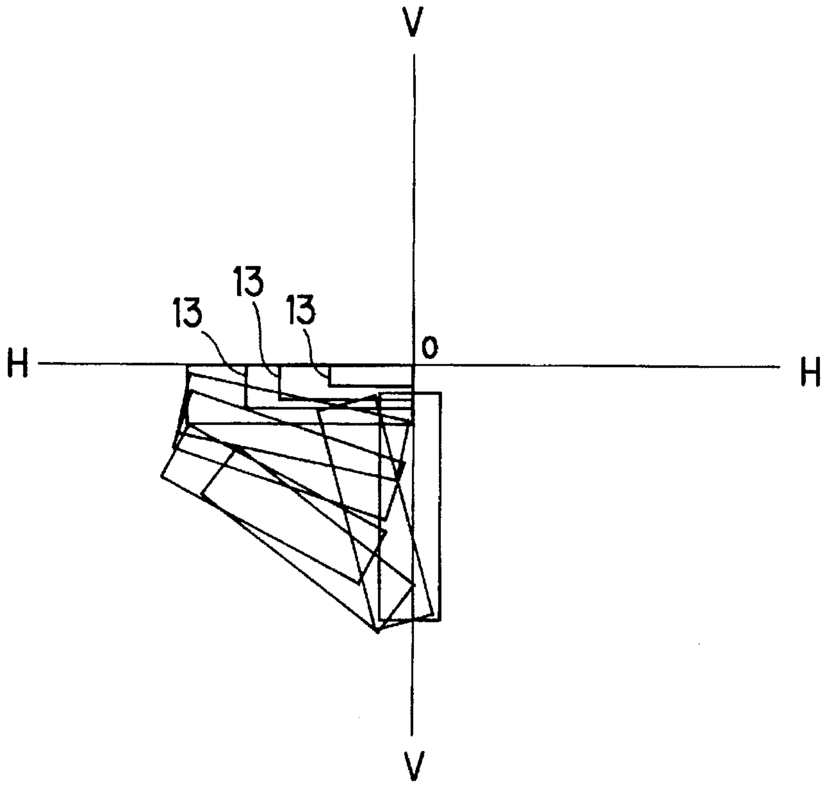

FIG. 4A schematically illustrates the arrangement of filament images projected by the region 3 of the reflector surface 2, and FIG. 4B schematically illustrates the arrangement of filament images projected by the region 4 of the reflector surface. The noted restrictive conditions on tangent vectors and the twisting of the tangents have been employed in designing that part of the reflector region 3 which is closer to the xy-plane in FIG. 1. Consequently, those filament images 12 due to the reflector region 3 which lie close to the horizontal line H—H have their top edges aligned along the horizontal line. It will be further noted that these filament images 12 have their left edges nearly superposed one upon another, not protruding beyond the vertical line V—V into the left side thereof.

The same restrictive conditions on tangent vectors and the twisting of the tangents have been imposed on that part of the reflector region 4 which is closer to the xy-plane, as on the corresponding part of the reflector region 3, the reflector region 4 being symmetrical with the reflector region 3 with respect to the xz-plane. Thus the arrangement of the filament images due to the reflector region 4 is symmetrical with that of the filament images due to the reflector region 3 with respect to the vertical line V—V. Those filament images 13 due to the reflector region 4 which lie close to the horizontal line H—H have their top edges aligned along the horizontal line, and their fight edges nearly in register with one another, not protruding beyond the vertical line V—V into the right side thereof.

Figure 5:
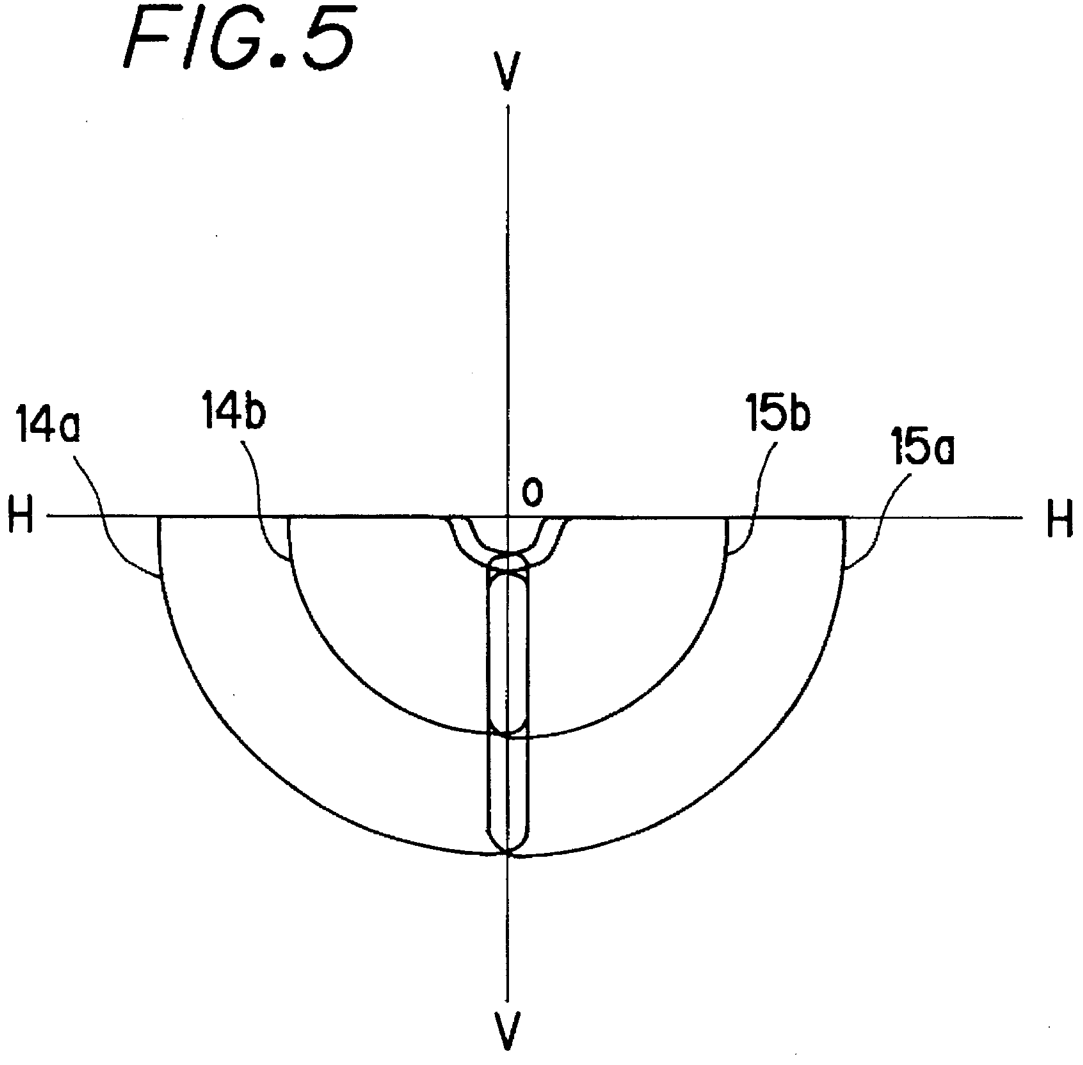
FIG. 5 shows a beam pattern due to the other two optical divisions of the FIG. 1 reflector.

The reflector regions 5 and 6, on the other hand, produce beam patterns on the test screen as illustrated in FIG. 5. Located on the left hand side of the vertical line V—V, the patterns 14*a* and 14*b* are due to the inner subregion 5*a* and outer subregion 5*b*, respectively. The patterns 15*a* and 15*b* on the right hand side of the vertical line V—V are due to the inner subregion 6*a* and outer subregion 6*b*, respectively. All the patterns due to the reflector regions 5 and 6 lie just under the line of the horizon H—H.

More specifically, the patterns 14*a* and 14*b* are both shaped like quarters of circles of different diameters centered approximately at the intersection 0, the pattern 14*a* being greater in radius. The patterns 15*a* and 15*b* are likewise shaped like quarters of circles of different diameters centered approximately at the intersection 0, the pattern 15*a* being greater in radius. The top edges of all these patterns also contribute to the creation of the top edge cutoff of the basic beam pattern produced by the reflector surface 2.

Figure 6A:
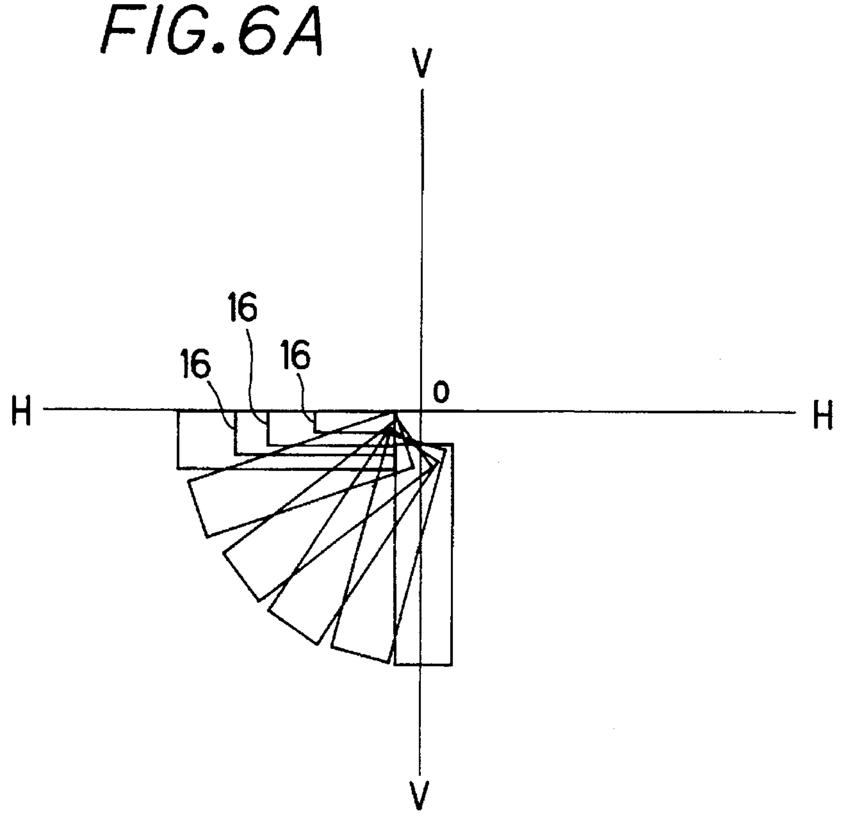
FIG. 6A and FIG. 6B are representations of filament images due to said other two optical divisions of the FIG. 1 reflector.
Figure 6B:
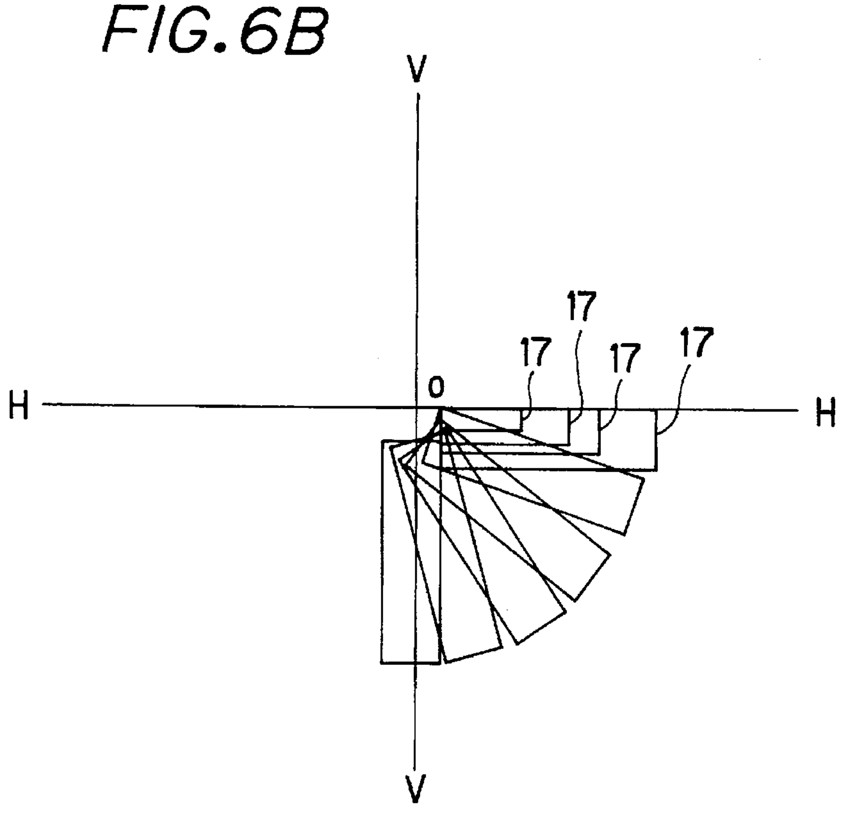

FIG. 6A schematically illustrates the arrangement of filament images projected by the reflector region 5, and FIG.

6B schematically illustrates the arrangement of filament images projected by the reflector region 6. The noted restrictive conditions on tangent vectors and the twisting of the tangents have been employed in designing those parts of the reflector regions 5 and 6 which are closer to the xy-plane in FIG. 1, the reflector regions 5 and 6 being symmetrical with respect to the xz-plane. Therefore, both those filament images 16 due to the reflector region 5, and those filament images 17 due to the reflector region 6, which lie close to the horizontal line H—H, have their top edges aligned along the horizontal line. Neither the fight hand edges of the filament images 16 nor the left hand edges of the filament images 17 protrude beyond the vertical line V—V.

It will be noted from both FIGS. 3 and 5 that the beam patterns due to the outer subregions *3b–6b* of the reflector are conducive to the creation of the high intensity zone of the total beam pattern. The beam patterns due to the inner subregions *3a–6b* are analogous in shape with, and greater in size than, those due to the outer subregions.

Figure 7:
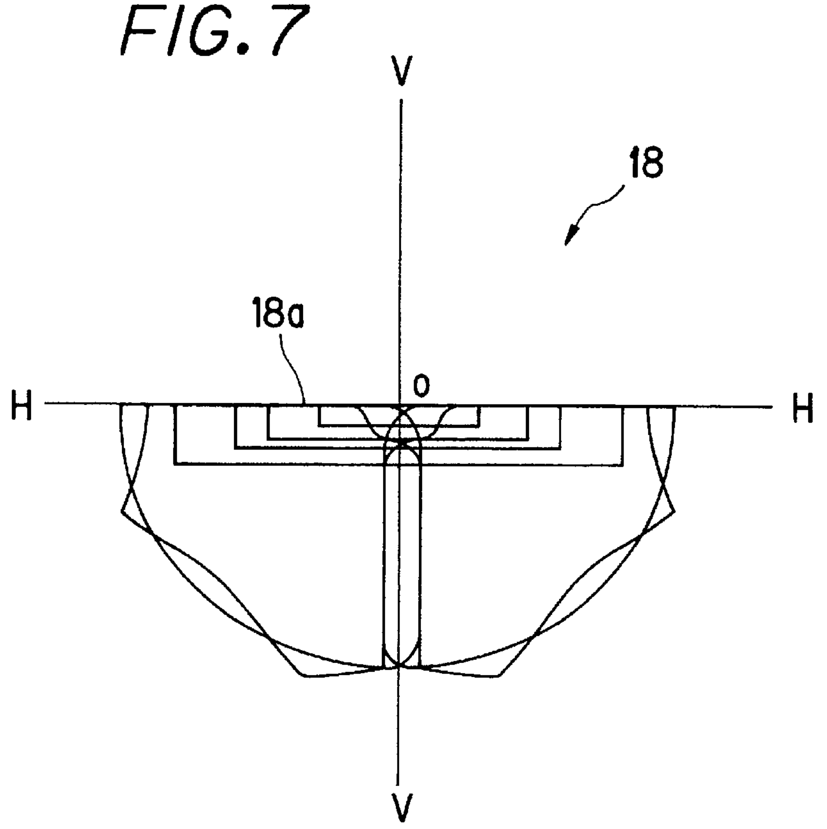
FIG. 7 shows the basic beam pattern due to the entire surface of the FIG. 1 reflector.

From the foregoing discussion of the beam patterns produced by the regions and subregions of the reflector surface 2, it will be understood that the complete reflector surface produces the basic or two-way beam pattern 18 depicted in FIG. 7. The basic beam pattern 18 is approximately semicircular in shape, symmetrical with respect to the vertical line V—V, and located below the horizontal line H—H. Particular attention is invited to the very sharply delineated top edge cutoff **18*a* of the beam pattern which extends along the horizontal line H—H, This clearcut top edge is attributable to the very optical design of the reflector according to the invention, Among other factors that enter into the reflector design, the longitudinal axes of the filament images on the test screen are aligned by arranging the tangent vectors at the terminal points of those curved plane patches which are dose to the xy-plane of FIG. 1**, at right angles with their position vectors. Further the top edges of the filament images are aligned by twisting the curved planes.

The basic beam pattern of FIG. 7 needs modification for providing either a lower beam pattern for vehicles keeping to the fight or one for those keeping to the left. Such modification is possible by means of the front lens customarily mounted in front of the reflector 1.

Figure 8:
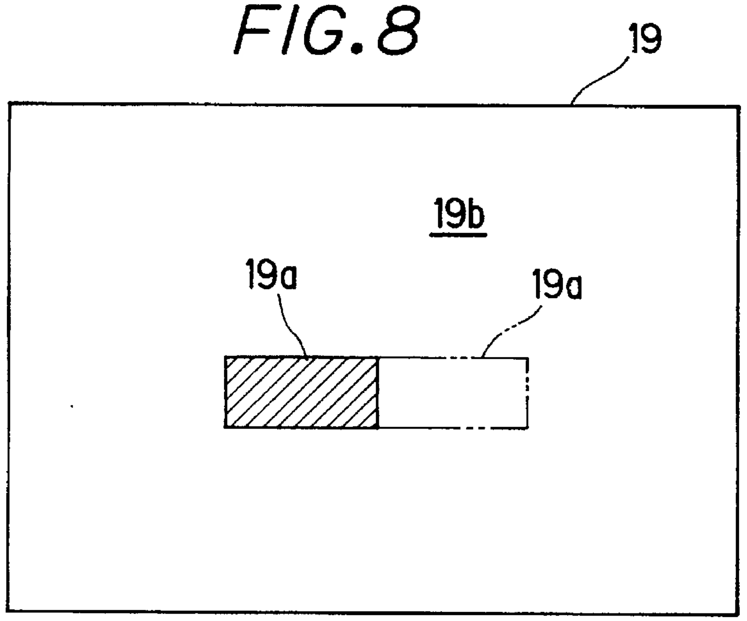
FIG. 8 is a front view of a from lens for modifying the FIG. 7 basic beam pattern into an actual lower beam pattern.

FIG. 8 shows in from view a from lens 19 configured according to the invention for modifying the basic beam pattern 18 into a lower beam pattern for vehicles keeping to the right. The from lens 19 has a hatched portion **19*a*, located approximately centrally of the lens and displaced somewhat to the left, which is stepped to deflect light upwardly. The remainder 19*b*** of the front lens is stepped to diverge light horizontally.

Figure 9A:
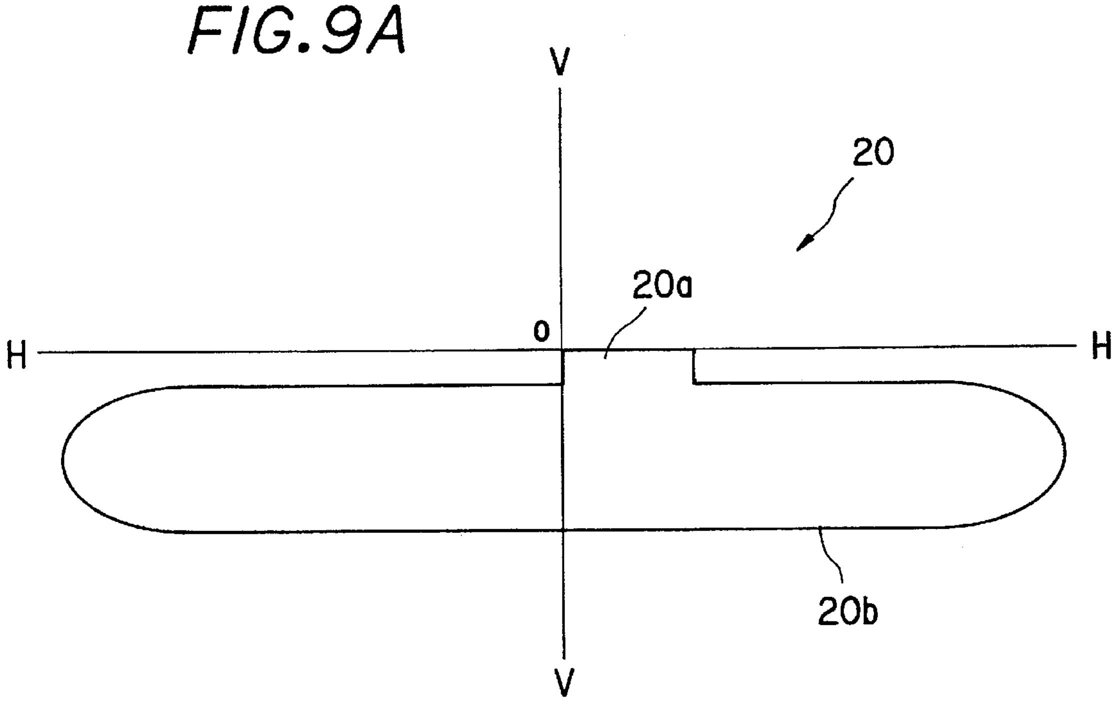
FIG. 9A and FIG. 9B show two actual lower beam patterns produced according to the invention for vehicles keeping to the fight and for those keeping to the left.

FIG. 9A is shown the lower beam pattern 20 for vehicles keeping to the right, as produced by the headlamp comprising the reflector 1 and front lens 19. Part **20*a* of the lower beam pattern has been raised by the portion 19*a* of the from lens 19 above the top edge cut off of the rest 20*b* of the lower beam pattern which has been expanded by the front lens portion 19*b*. It will be appreciated that the lower beam pattern 20 has a very sharply defined top edge because the basic beam pattern 18** has its top edge cut off very clearly and because this basic pattern has been mostly expanded only horizontally.

Figure 9B:
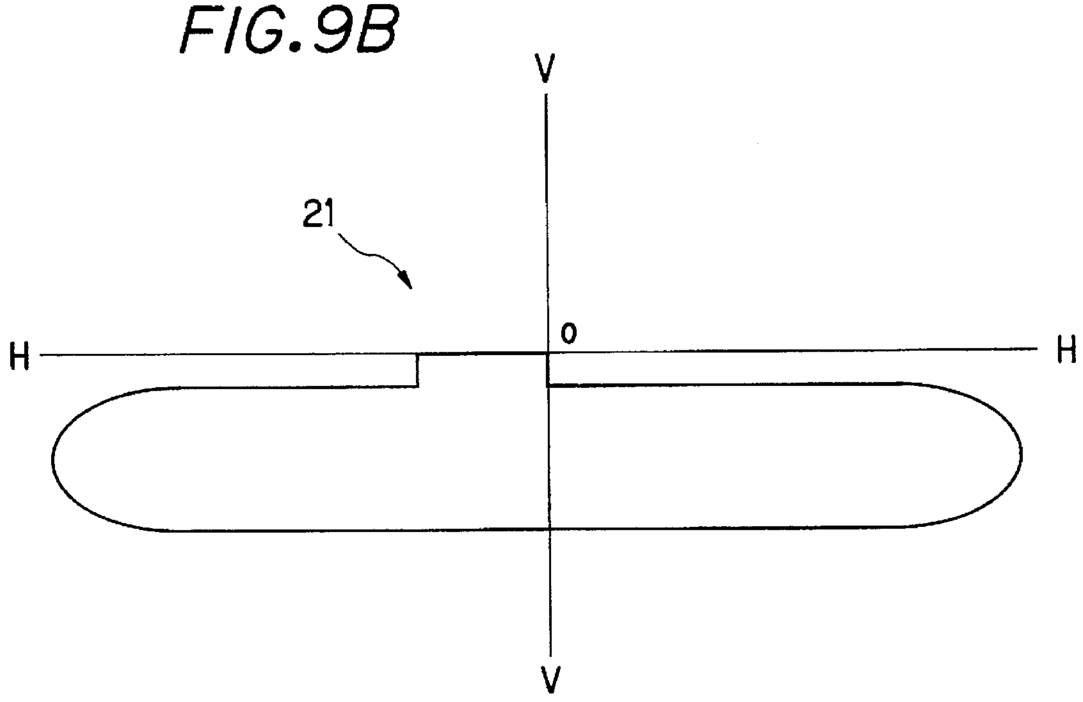

It is self-evident, then, that the basic beam pattern 18 is modifiable into a lower beam pattern 21 shown in FIG. 9B, solely by means of another front lens of similar make. In such an alternate front lens the portion **19*a* of the FIG. 8 front lens 19 may be positioned as indicated by the phantom outline and designated 19*a'* in the same figure. The reflector 1** itself, as well as other parts of the reflector, needs no modification at all for providing the two different lower beam patterns.

Despite the foregoing detailed disclosure, it is not desired that the invention be limited by the exact showing of the drawings or the description thereof. For example, the bulb filament could be arranged with its axis at right angles with the optical axis of the reflector, instead of in alignment therewith as in the illustrated embodiment. These and other modifications, alterations and adaptations of the invention will suggest themselves to one skilled in the art without departing from the scope of the invention as expressed by the claims which follow.

What is claimed is:

1. A vehicular headlamp for providing a lower beam pattern having a sharply defined top edge cutoff, wherein the improvement comprises:

(a) a light source;

(b) a reflector reflecting light emitted by the light source, the reflector producing a basic beam pattern of symmetrical shape which is wholly disposed below a horizon and which has a top edge cutoff extending horizontally; and (c) a front lens producing a lower beam pattern by raising part of the basic beam pattern above the top edge cutoff and by horizontally expanding the rest of the basic beam pattern;

(d) whereby the lower beam pattern has a top edge cutoff as sharply defined as the top edge cutoff of the basic beam pattern.

2. The vehicular headlamp of claim 1 wherein the basic beam pattern is approximately semicircular in shape.

3. A vehicular headlamp as recited in claim 1, wherein all of the light reflected by said reflector is used to form said basic beam pattern.

4. A vehicular headlamp capable of producing either of two different lower beam patterns of asymmetrical shape for vehicles keeping to the right and for vehicles keeping to the left, comprising:

(a) a light source;

(b) a reflector reflecting light emitted by the light source, the reflector producing a basic beam pattern of symmetrical shape which is wholly disposed below a horizon and which has a top edge cutoff extending horizontally; and (c) a front lens producing a lower beam pattern by raising part of the basic beam pattern above the top edge cutoff and by horizontally expanding the rest of the basic beam pattern;

(d) whereby two lower beam patterns are producible by raising different parts of the two-way beam pattern, the resulting lower beam patterns having top edge cutoffs as sharply defined as the top edge cutoff of the basic beam pattern.

5. The vehicular headlamp of claim 3 wherein the two-way beam pattern is semicircular in shape.

6. A vehicular headlamp as recited in claim 1, wherein said reflector is shaped so as to define four quadrants when viewed from a front of said reflector, said four quadrants being defined by a first, horizontal axis and a second, vertical axis, said first and second axes intersecting each other at a center of said light source, and wherein a third axis is drawn through the center of said light source so that said third axis is perpendicular to said first axis and to said second axis, and wherein two of said quadrants below said first axis and on opposite sides of said second axis are symmetrical about a plane which includes said second and third axes.

7. The reflector as recited in claim 6, wherein beam patterns produced by said two of said quadrants of said reflector are symmetrical about said plane.

8. The reflector as recited in claim 6, wherein said basic beam pattern is formed by the light reflected from all four of said quadrants.

* * * * *